(12) United States Patent
Jahn et al.

(10) Patent No.: US 10,965,155 B2
(45) Date of Patent: Mar. 30, 2021

(54) SYSTEM FOR NON-CONTACT TRANSMISSION OF ELECTRICAL ENERGY TO A MOBILE PART

(71) Applicant: SEW-EURODRIVE GMBH & CO. KG, Bruchsal (DE)

(72) Inventors: Nils-Malte Jahn, Heidelberg (DE); Thomas Krempel, Hambrücken (DE); Björn Egger, Bruchsal (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 0 days.

(21) Appl. No.: 16/754,127

(22) PCT Filed: Sep. 26, 2018

(86) PCT No.: PCT/EP2018/025250
§ 371 (c)(1),
(2) Date: Apr. 6, 2020

(87) PCT Pub. No.: WO2019/068366
PCT Pub. Date: Apr. 11, 2019

(65) Prior Publication Data
US 2020/0287412 A1    Sep. 10, 2020

(30) Foreign Application Priority Data
Oct. 6, 2017 (DE) .................... 10 2017 009 285.0

(51) Int. Cl.
*H01F 38/00* (2006.01)
*H02J 50/00* (2016.01)
(Continued)

(52) U.S. Cl.
CPC ............ *H02J 50/005* (2020.01); *B60L 53/30* (2019.02); *H01F 27/02* (2013.01); *H01F 38/14* (2013.01); *H02J 50/10* (2016.02)

(58) Field of Classification Search
CPC . H02J 5/005; H02J 7/025; H02J 17/00; H01F 38/14; B60L 11/182
(Continued)

(56) References Cited

U.S. PATENT DOCUMENTS 5,528,113 A   6/1996 Boys et al.
9,735,606 B2* 8/2017 Koyanagi ............ H04B 5/0037
(Continued)

FOREIGN PATENT DOCUMENTS

DE   102009057437 A1   6/2011
JP     2012222956 A    11/2012
(Continued)

*Primary Examiner* — Quan Tra
(74) *Attorney, Agent, or Firm* — Carter DeLuca & Farrell LLP

(57) ABSTRACT

In a system for a non-contact transmission of electrical energy to a mobile part, the system has a bore introduced into a floor material, a frame part is accommodated in the bore, a receiving part is situated in the frame part, an electronic circuit is situated in the receiving part, the receiving part is at least partially covered by a cover part in the manner of a housing, in particular on one of its sides, a sheet-metal part is situated between the receiving part and the frame part, and the sheet-metal part touches the receiving part and the sheet-metal part touches the frame part.

14 Claims, 2 Drawing Sheets

(51) Int. Cl.
*H02J 50/10* (2016.01)
*B60L 53/30* (2019.01)
*H01F 27/02* (2006.01)
*H01F 38/14* (2006.01)

(58) Field of Classification Search
USPC .......................................................... 307/104
See application file for complete search history.

(56) References Cited

U.S. PATENT DOCUMENTS

| | | | |
|---|---|---|---|
| 9,796,280 B2* | 10/2017 | McCool | B60L 11/182 |
| 10,424,962 B2* | 9/2019 | Graham | H02J 50/70 |
| 10,607,761 B2* | 3/2020 | Nishimura | H01F 27/06 |
| 2012/0218068 A1 | 8/2012 | Yamakawa et al. | |
| 2013/0112519 A1 | 5/2013 | Anders | |
| 2014/0240947 A1 | 8/2014 | Nakamura et al. | |
| 2014/0361635 A1 | 12/2014 | Ookawa et al. | |
| 2015/0188357 A1* | 7/2015 | Chen | H01F 27/02 |
| | | | 320/108 |
| 2017/0237295 A1 | 8/2017 | Yuasa | |

FOREIGN PATENT DOCUMENTS

| | | |
|---|---|---|
| WO | 2011117714 A2 | 9/2011 |
| WO | 2016143341 A1 | 9/2016 |

\* cited by examiner

SYSTEM FOR NON-CONTACT TRANSMISSION OF ELECTRICAL ENERGY TO A MOBILE PART

FIELD OF THE INVENTION

The present invention relates to a system for a non-contact transmission of electrical energy to a mobile part.

BACKGROUND INFORMATION

U.S. Patent Application Publication No. 2014/0240947 describes a power-receiving device.

PCT Patent Application Publication No. WO 2011/117714 describes a system for a non-contact transmission of electrical energy.

Japanese Patent Application Publication No. 2012-222956 describes a system for a non-contact transmission of electrical energy.

U.S. Patent Application Publication No. 2012/0218068 describes an antenna.

U.S. Patent Application Publication No. 2017/0237295 describes a system for a non-contact transmission of electrical energy.

U.S. Pat. No. 5,528,113 describes a system for an inductive transmission of electrical energy.

U.S. Patent Application Publication No. 2014/0361635 describes a system for a non-contact transmission of energy.

SUMMARY

Example embodiments of the present invention provide a compact charging unit for inductive transmission.

According to example embodiments of the present, in a system for a non-contact transmission of electrical energy to a mobile part, the system has a bore that is introduced into a floor material, a frame part is accommodated in the bore, a receiving part is situated in the frame part, an electronic circuit is situated in the receiving part, the receiving part is at least partially covered by a cover part in the manner of a housing, in particular on one of its sides, a sheet-metal part is situated between the receiving part and the frame part, and the sheet-metal part touches the receiving part and the sheet-metal part touches the frame part.

This has the advantage of an improved heat dissipation because the heat from the receiving part for the electronic circuit is passed to the frame part through the sheet-metal part, i.e., a material that provides excellent heat conduction. The frame part is directly connected to the concrete material. Since concrete material provides good thermal conduction, an effective heat dissipation is therefore ensured. In addition, the sheet-metal part is able to be produced in an uncomplicated and cost-effective manner from corrugated sheet metal so that linear contact is provided both radially outside and inside in each case. A voltage-proof electrical insulation is able to be ensured by forming the receiving part from plastic.

According to example embodiments, the frame part is integrally connected to the floor material with the aid of casting compound. This has the advantage that thermally conductive casting compound further improves the heat transition between the frame part and the floor material.

According to example embodiments, the receiving part is made of plastic. This offers the advantage that sufficient dielectric strength is achievable. Even if the electronic circuit is configured for high voltages, a sufficient electrical insulation clearance with respect to the environment is therefore able to be achieved.

According to example embodiments, the sheet-metal part is produced from corrugated sheet metal, and the sheet-metal part is arranged to surround the receiving part in the circumferential direction. This has the advantage that a cost-effective production is possible and that the heat absorbed in the linear contact in the radially inward direction is spread out so that a portion of the heat flow at the large surface is emitted into the air surrounding the sheet-metal part. As a result, the heat not only flows into the frame part at the linear contact between the sheet-metal part and the frame part but also from the air that surrounds the sheet-metal part toward the frame part.

According to example embodiments, the electronic circuit has a power inverter and/or a gyrator, in particular, the connection of the power inverter on the alternating voltage side is connected to the input side of the gyrator, and the output-side connection of the gyrator is connected to the primary winding, and the components such as the capacity and inductivity of the gyrator are resonantly adapted to the frequency of the alternating voltage supplied at the output of the power inverter on the alternating voltage side. This has the advantage that the power inverter has a voltage-source-type behavior on its alternating voltage-side connection but the primary winding is fed from the gyrator featuring a current-source-type behavior. As a result, an alternating current is impressed into the primary winding.

According to example embodiments, a primary winding, which is able to be inductively coupled to a secondary winding situated on the underside of the mobile part, is disposed in the cover part. This has the advantage that energy is able to be transmitted in a non-contact manner.

According to example embodiments, the number of corrugations extending in the circumferential direction is greater than twenty. This is considered advantageous insofar as a high number of linear contacts is provided and an excellent heat transfer is achieved as a result.

According to example embodiments, the sheet-metal part is produced from aluminum or copper. This has the advantage that the sheet-metal part is able to be produced from a material that provides good thermal conduction.

According to example embodiments, the cover part is made from plastic. This offers the advantage that the primary winding is able to be positioned in a manner that provides insulation resistance while the mobile part is still able to move smoothly across the cover part. For example, the cover part flushly adjoins the surface of the base material provided with a coating toward this end.

Further features and aspects of example embodiments of the present invention are described in greater detail below with reference to the appended Figures.

DETAILED DESCRIPTION

Figure 1:
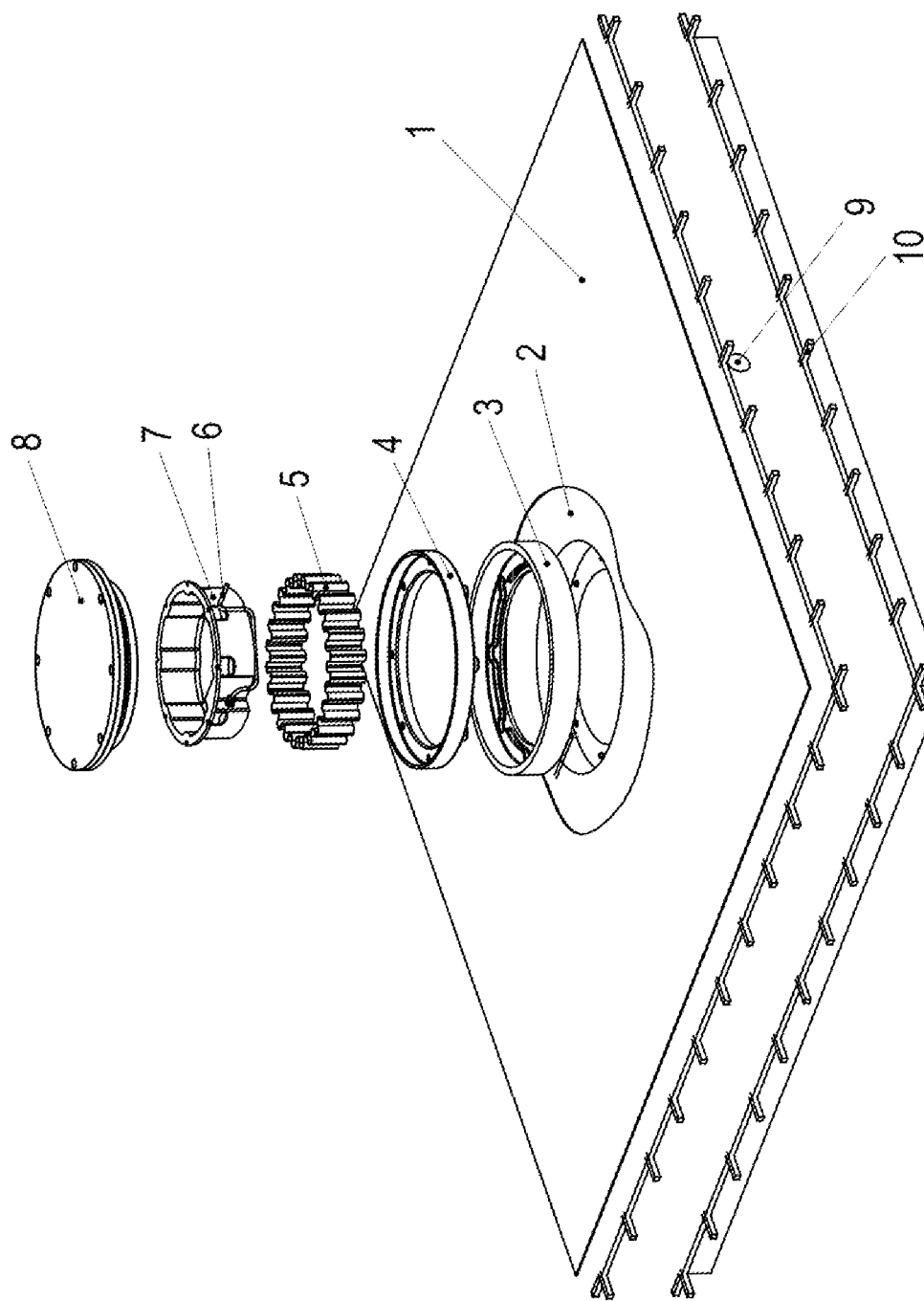
FIG. 1 is a schematic exploded view of a system for a non-contact transmission of electric energy to a mobile part.
Figure 2:
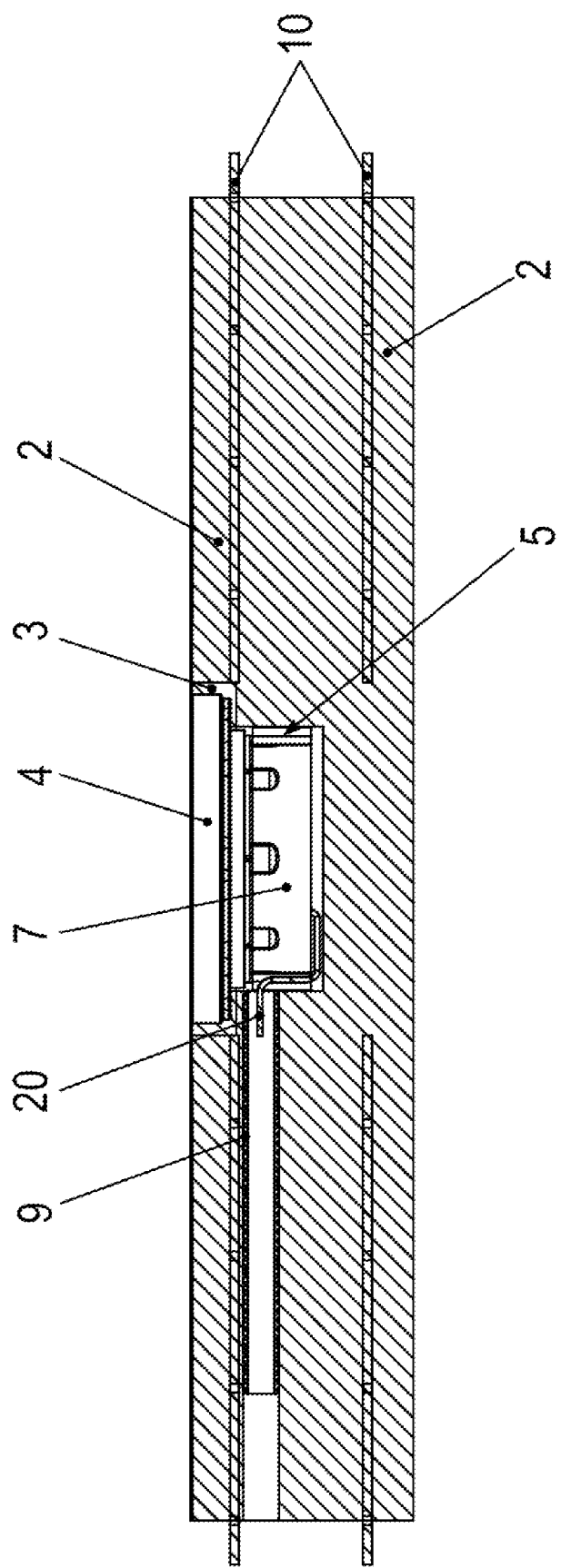
FIG. 2 is an associated schematic cross-sectional view.

As schematically illustrated in FIGS. 1 and 2, floor material 2 of the floor of a system is provided with a coating 1 whose surface functions as a travel surface for a mobile part.

Situated on the underside of the mobile part is a secondary winding, which is able to be inductively coupled to a primary winding situated on the floor at a position of the mobile part.

Reinforcement 10 made of steel rods is situated in floor material 2 as well as an empty conduit in which a cable 6 is routed to a charging unit, which is situated in a bore, in particular a stepped bore, introduced into the floor material.

A frame part 4, which is integrally connected to floor material 2 with the aid of casting compound 3, is placed on the step of the recess arranged as a stepped bore.

A receiving part 7, which is made of plastic, is situated in the frame part, and a sheet-metal part 5, which touches both frame part 4 and receiving part 7, is situated between frame part 4 and receiving part 7.

A cover part 8, in which the primary winding is situated, is disposed in receiving part 7.

The primary winding is supplied with an alternating current from an electronic circuit that is also accommodated in receiving part 7 and supplied with electrical power with the aid of cable 6.

The electronic circuit includes a power inverter whose connection on the alternating voltage side feeds a gyrator that feeds the primary winding on the output side and is resonantly adapted to the frequency of the voltage supplied at the connection of the power inverter on the alternating voltage side.

Sheet-metal part 5 is arranged as corrugated sheeting. Sheet metal part 5 surrounds receiving part 7 at its circumference. In the circumferential direction, the region covered by sheet metal part 5 covers the region covered by receiving part 7 in the circumferential direction.

In the same manner, the region axially covered by receiving part 7 overlaps with the region axially covered by sheet metal part 5.

As a result, better heat dissipation of the electronic circuit is achieved because sheet metal part 5 functions as a heat conduction bridge for the heat dissipation.

The cover part may be produced from a non-magnetic material, e.g., plastic or aluminum.

Cover part 5 is disposed so as to be flush with the driving surface so that travel across cover part 5 is possible without hindrance.

Sheet-metal part 5 has corrugations featuring an amplitude, the corrugation length in the circumferential direction covering a circumferential angular range of less than 20°, the number of corrugations at the circumference being, for example, greater than eighteen, and the corrugation length in the circumferential direction amounting to 15°, in particular. The amplitude of the corrugations may amount to one half of the difference between the greatest radial distance of receiving part 7 and the smallest radial distance of frame part 4.

The sheet-metal part may be produced from aluminum or copper so that high thermal conductivity is provided. As an alternative, cost-effective steel sheeting may be used as well.

LIST OF REFERENCE NUMERALS

1 coating
2 floor material
3 casting compound
4 frame part
5 sheet-metal part
6 cable
7 receiving part
8 cover part
9 empty conduit
10 reinforcement

The invention claimed is:

1. A system for a non-contact transmission of electrical energy to a mobile part, comprising:
   a frame part adapted to be accommodated in a bore provided in a floor material;
   a receiver part arranged in the frame part;
   an electronic circuit arranged in the receiving part;
   a cover at least partially covering the receiver part; and
   sheet-metal part arranged between the receiver part and the frame part and touches the receiver part and the frame part.

2. The system according to claim 1, wherein the cover at least partially covers at least one side of the receiver part.

3. The system according to claim 1, wherein the sheet-metal part is made of corrugated sheet metal and is produced from aluminum and/or copper.

4. The system according to claim 1, wherein the frame part is adapted to be integrally connected to the floor material by a casting compound.

5. The system according to claim 1, wherein the receiver part is made from plastic.

6. The system according to claim 1, wherein the sheet-metal part is produced from corrugated sheet and surrounds the receiving part in a circumferential direction.

7. The system according to claim 1, wherein the electronic circuit includes a power inverter and/or a gyrator.

8. The system according to claim 1, wherein the electronic circuit includes a power inverter and a gyrator, a connection of the power inverter on an alternating voltage side connected to an input side of the gyrator, and an output-side connection of the gyrator is connected to a primary winding, components of the gyrator being resonantly adapted to a frequency of an alternating voltage supplied at an output of the power inverter on the alternating voltage side.

9. The system according to claim 8, wherein the components of the gyrator includes a capacitance and/or an inductance.

10. The system according to claim 1, wherein a primary winding, adapted to be inductively coupled to a secondary winding provided on an underside of the mobile part, is provided in the cover part.

11. The system according to claim 1, wherein a number of corrugations extending in a circumferential direction is greater than twenty.

12. The system according to claim 1, wherein the sheet-metal part is produced from aluminum or copper.

13. The system according to claim 1, wherein the cover part is made from plastic.

14. A system for a non-contact transmission of electrical energy to a mobile part, comprising:
   a frame part accommodated in a bore provided in a floor material;
   a receiver part arranged in the frame part;
   an electronic circuit arranged in the receiving part;
   a cover at least partially covering the receiver part; and
   sheet-metal part arranged between the receiver part and the frame part and touches the receiver part and the frame part.

* * * * *